July 31, 1962 H. E. TELLEFSEN ETAL Re. 25,214

ANNUNCIATOR SYSTEM

Original Filed May 20, 1957 3 Sheets-Sheet 1

INVENTORS
Harold E. Tellefsen
Richard I. White
Sergio Alessio
By Wallenstein & Spangenberg Attys

ANNUNCIATOR SYSTEM

Original Filed May 20, 1957 3 Sheets-Sheet 2

Fig. 5.

| Circuit Conditions | core 37a | E1 | core 37a | E2 | R | W |
|---|---|---|---|---|---|---|
| Normal | SM | disc | SM | S | OFF | OFF |
| Abnormal | NSM | NS | SM | S | ON | ON |
| Acknowledged | SM | S | NSM | NS | OFF | ON |
| Return to Normal at any time | SM | Disc | SM | S | OFF | OFF |
| S = Signal passes through output winding | | | | | | |
| NS = No signal passes through output winding | | | | | | |
| SM = Saturation of core maintained | | | | | | |
| NSM = Core driven beteen opposite states of saturation | | | | | | |
| Disc = disconected | | | | | | |

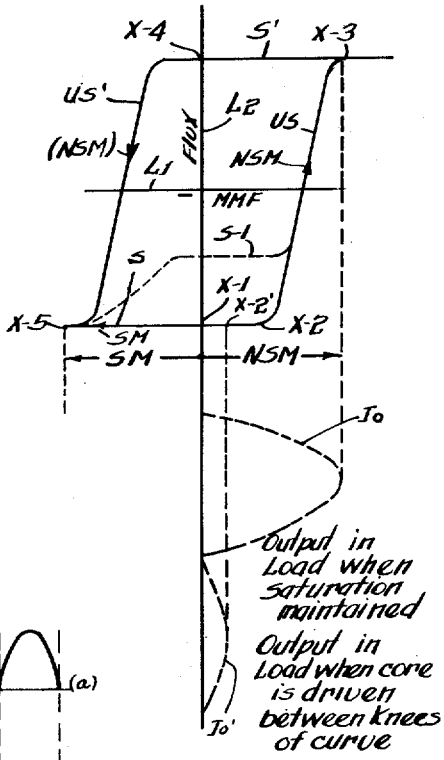

Fig. 4.

Fig. 10.

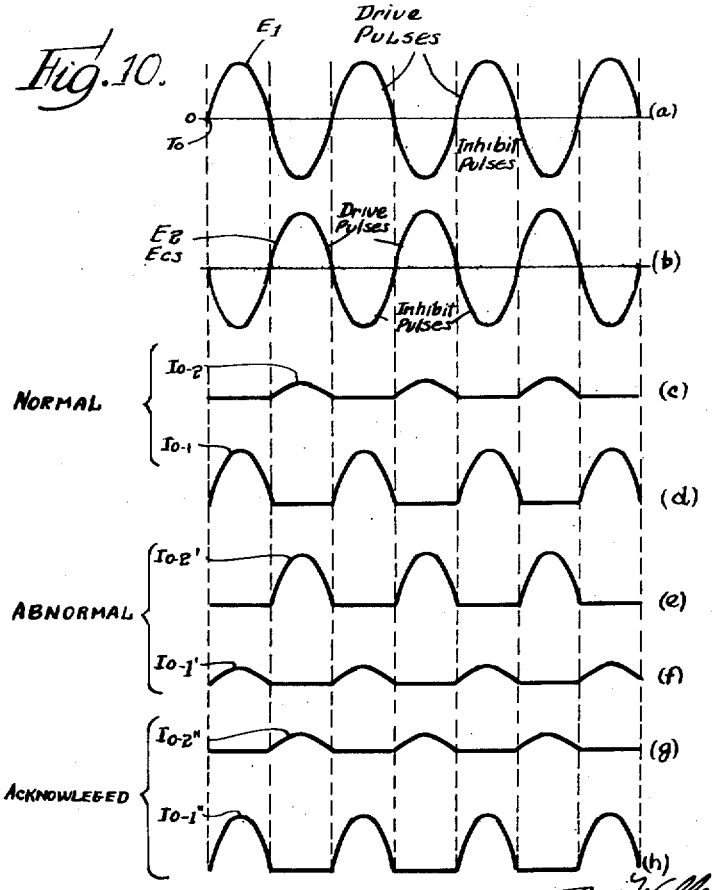

INVENTORS
Harold E. Tellefsen
Richard I. White
Sergio Alessio
By: Wallenstein & Spangenberg Attys

ANNUNCIATOR SYSTEM

Original Filed May 20, 1957 3 Sheets-Sheet 3

Fig. 7.

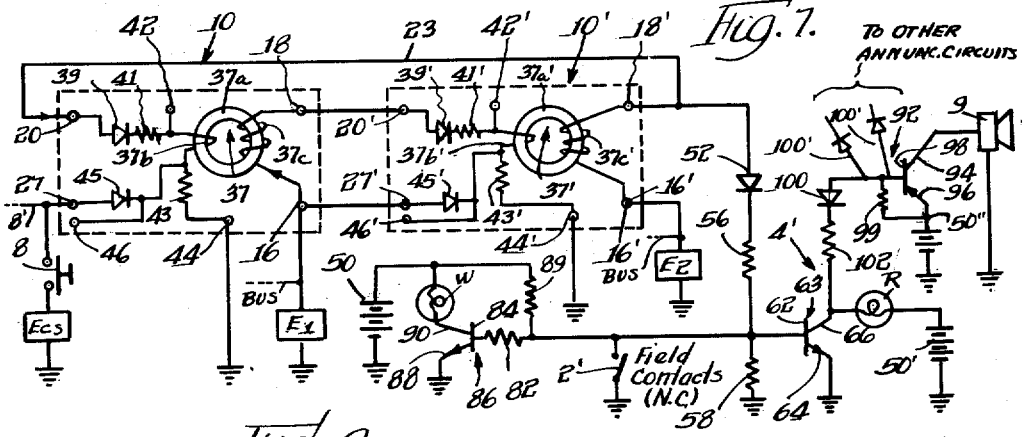

Fig. 9.

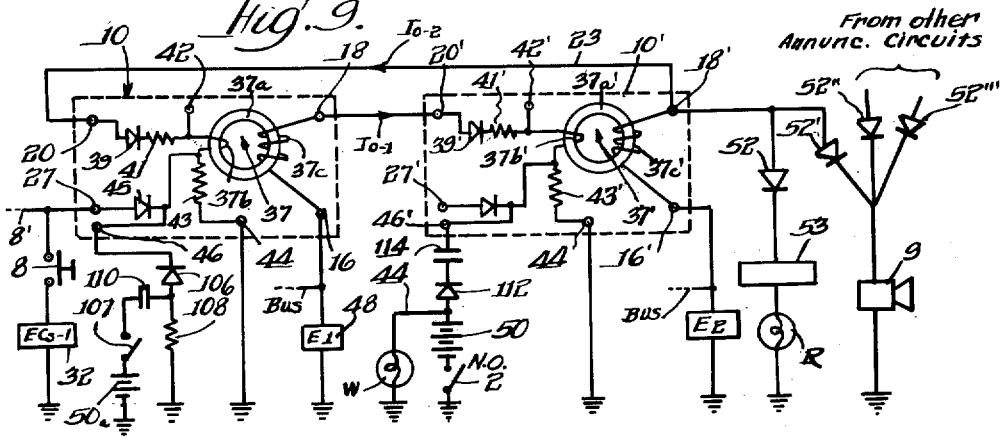

| Circuit Conditions | Core 37a | $E_1$ | Core 37a | $E_2$ | R | W |
|---|---|---|---|---|---|---|
| Normal | SM | S | NSM | NS | OFF | OFF |
| Abnormal | NSM | NS | SM | S | ON | ON |
| Return to normal (Before Ack.) | NSM | NS | SM | S | ON | OFF |
| Acknowledged (still abnormal) | SM | S | NSM | NS | OFF | ON |
| Return to normal (After Ack.) | SM | S | NSM | NS | OFF | OFF |

Fig. 11.

Fig. 6.

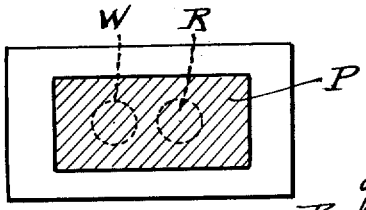

INVENTORS.
Harold E. Tellefsen
Richard I. White
Sergio Alessio
By Wallenstein & Spangenberg
Attys United States Patent Office Re. 25,214
Reissued July 31, 1962

25,214
ANNUNCIATOR SYSTEM

Harold E. Tellefsen, Chicago, Richard L. White, Skokie, and Sergio Alessio, Chicago, Ill., assignors, by mesne assignments, to Isi, Incorporated, Los Angeles, Calif., a corporation of Delaware Original No. 2,931,018, dated Mar. 29, 1960, Ser. No. 660,137, May 20, 1957. Application for reissue Sept. 19, 1960, Ser. No. 57,092
13 Claims. (Cl. 340—213)

Matter enclosed in heavy brackets [ ] appears in the original patent but forms no part of this reissue specification; matter printed in italics indicates the additions made by reissue.

This invention relates to annunciator systems of the type wherein a visual alarm unit, such as a light unit, is provided for each variable to be monitored, and, when the variable becomes abnormal, the visual alarm unit provides an indication that the variable has just become abnormal. A manually operable acknowledgement control is provided which, when operated, changes the indication of the visual alarm unit to indicate that the alarm has been acknowledged by the operator. Usually, an audible alarm is also provided to attract the operator's attention to a central control panel containing the visual alarm units associated with practically all of the variables to be monitored in the plant involved, so that the operator can determine at a glance the condition of all of the variables.

Annunciator systems of the kind just described have heretofore been hydraulically or relay controlled systems. Obviously, it is quite important for annunciator systems to be reliable since, otherwise, they could not fulfill their intended purpose. Due to mechanical wear on relay contacts and of the various movable parts in hydraulic systems, the reliability of such annunciator systems left much to be desired.

It is, accordingly, one of the objects of the present invention to provide an annunciator system operating, for the most part, with non-mechanical or static components, such as magnetic core units having opposite magnetic states which respectively are utilized to control the operation of the alarm units.

Another object of the present invention is to provide an annunciator unit which operates electrical alarm units with static or non-mechanical control components, for the most part, and which therefore minimizes the number of places in the system where sparking may occur, so that the system may be used in explosive atmospheres without providing extensive hermetically sealed housings for the control components in question.

A further object of the present invention is to provide an annunciator unit utilizing non-mechanical or static control components, particularly magnetic core units, comprising a minimum of components and at a minimum cost. A related object of the present invention is to provide annunciator units of magnetic core control units which may substantially duplicate the type of visual alarm unit sequences heretofore available in relay controlled annunciator units.

A still furhter object of the present invention is to provide an annunicator system which is of substantially simpler construction and is less expensive than prior annunciator units of a similar or less degree of reliability and providing a similar visual alarm sequence.

An over-all object of the present invention is to provide an annunciator unit accomplishing all of the various above-mentioned objects.

In accordance with a preferred form of the invention, the basic annunciator alarm sequence is obtained through the use of only two magnetic core units, each having an input and an output winding wound about a core of magnetic material having a rectangular hysteresis characteristic, to provide sharply-defined opposite magnetic states of staturation. In magnetic cores of this type, if a main signal source is connected in series with an output winding of one of the core units and with a load device, which may comprise the input winding of the other core unit, the output winding of the first-mentioned core acts like a high impedance when the signal source is driving the core between its opposite states of saturation, resulting in a relatively small current or voltage in the load device or input winding of the second-mentioned core unit. This may represent a so called no-signal output condition of the core unit. If the signal from the signal source is operable to maintain merely the state of saturtaion of the core, so that the core is not reset thereby to opposite states of saturation, then the output winding acts like a relatively small impedance, and a relatively large voltage or signal appears in the load device. This may be referred to as a signal output condition of the core unit. The core unit thus acts like a gate circuit which is closed when the core is being driven between its opposite states of saturation and which is open when its state of saturation is being maintained. The relatively large signal occurring in the output circuit of the first core unit could be utilized to trigger the second-mentioned core unit, constituting the above-mentioned load device, to an opposite state of magnetic saturation.

It can thus be seen that if a control signal source is connected across the input winding of the first-mentioned core unit, which signal source provides spaced-apart driving pulses of a polarity which drives or sets the first-mentioned core only from a reference to an opposite state of saturation during periods occurring between the application of similar drive pulses provided by said first-mentioned main signal source which pulses reset the core to its reference state of saturation, a no-signal output condition at the output of the first core unit will be provided. Now, if the input winding of the second core unit is connected as the load for the first core unit and the output winding of the second core unit is connected to a second main signal source producing spaced-apart resetting drive pulses which occur between the drive pulses of the first main signal source, the no-signal output condition of the first core unit, which is the control signal input condition of the second core unit, will enable the second main signal source to maintain the state of saturation of the second core unit and thus provide a signal output condition therefor. The signal output of the second core unit could be the abovementioned control signal source of the first core unit, if the output of the second core unit is fed to the input winding of the first core unit. In such case, a bistable circuit is provided wherein the signal output condition of either core unit controls the signal output condition of the other core unit. Moreover, each core unit is connected as a "not" gate circuit, meaning that a signal output condition is present if a no-signal condition exists at the core input and a no-signal output condition is present if a signal condition exists at the core unit input.

An annunciator circuit is formed with the above-mentioned bistable gate circuit by connecting a first visual alarm means in the output circuit of one of the core units and providing a condition-responsive control means, such as a normally open or normally closed set of field contacts, which may be a thermocouple controlled set of contacts where temperature variables are involved, which exercises control over the output condition of said one core unit, or the effect of an output condition of the core unit on the visual alarm means. The field contacts are also preferably connected to a second visual alarm means which is controlled directly by the field contacts, independently of the core units. An acknowledgement witch is provided which when momentarily depressed riggers the core unit controlling the first visual alarm neans to a no-signal output condition which de-energizes the first visual alarm means without affecting the econd visual alarm means. The interconnection of the ore units is such that the no-signal condition of the atter core unit is maintained even though the acknowldgement switch is released. Between the conditions of ne two visual alarm means, the operator can tell hether the variable involved is normal or abnormal, nd, if abnormal, whether it has been acknowledged by ne operator.

Other features of the invention relate to the particular rrangement of circuit components used in conjunction ith the various core units to provide for maximum reability and minimum cost. An annunciator circuit contructed in accordance with the present invention can e made to sell for a substantially lower price than relay nnunciator units now available on the market. In adition to the lower cost, the circuit offers substantially reater reliability than relay annunciator circuits and ther types of annunciator circuits heretofore utilized.

Other objects, advantages and features of the invenon will become apparent by making reference to the pecification to follow, the claims and the drawings herein:

FIG. 4 shows a sample hysteresis curve of the core aterial used in the core units of the annunciator circuit;

FIG. 5 is a table of the various operating conditions f the annuciator circuit of FIG. 2;

FIG. 6 shows a method of mounting the alarm lights that a standard flashing sequence is obtained;

FIG. 7 shows a form of the present invention operating ith normally closed field contacts and utilizing transtors for directly controlling the energization of the arm lights;

FIG. 9 shows a still further and preferred form of the sic invention;

FIG. 10 shows the current and voltage waveforms in rious parts of the annunciator circuit in FIG. 9, durg the various phases of operation thereof; and FIG. 11 is a table illustrating the various operating contions of the annunciation circuit of FIG. 9.

Figure 1:
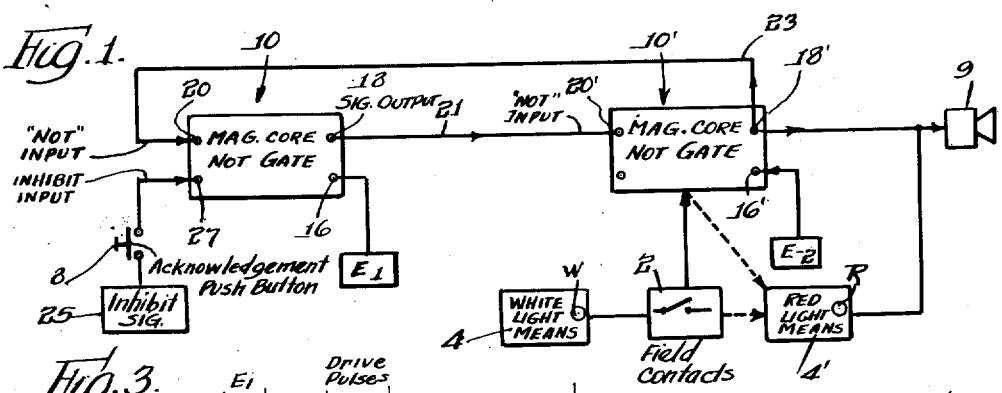
FIG. 1 is a simplified box diagram of an annunciator ircuit constructed in accordance with the present invenon.

Refer now to FIG. 1 which illustrates an annunciator paratus in box diagram form constructed in accordance th the present invention. The annunicator apparatus ay include the basic components usually found in annciator systems, including a suitable variable condition sponsive device, such as field contacts 2 which have posite positions of operation representing respectively rmal and abnormal conditions of the variable being onitored, visual alarm means which may comprise hite and red alarm light means 4 and 4′ including reectively a white light W and a red light R, and an acowledgement switch 8. Although a separate two-light stem is shown, it will be shown later on that an aprent one-light system may also be formed by combin g the two lights R and W in a manner to be explained. In a two-light system, when the field contacts are opted to their alarm indicating positions, the annuntor apparatus may energize both light means so that white light W and the red light R will both be lit ightly. Provision is usually made for energizing an audible alarm such as a horn 9. Light sources W and R are normally mounted on a common panel with a large number of other lights associated with other variables. In such case, it may be desirable to provide a flashing light indication for, say, the red light source R, to attract the operator to the particular part of the panel where the lights in question are located. The red light means 4′, may, in such case, include flasher apparatus for flashing the red light source R. When the acknowledgement switch 8 is momentarily depressed, the visual alarm indicating means are changed to indicate an acknowledged alarm condition, assuring that the variable involved is still abnormal. In the embodiment being illustrated, the acknowledged alarm condition may be shown by extinguishing the red light R, leaving only the white light source W brightly lit. In the one light visual alarm sequence, an initial alarm indication could be identified by a flashing light and an acknowledged alarm condition could be indicated by a steady light. When the variable being monitored returns to normal, the alarm lights are extinguished.

In accordance with the preferred form of the present invention, the field contacts and the acknowledgement switch are associated with magnetic core control circuits, generally indicated by reference numerals 10 and 10′, arranged as "not" gate circuits. The magnetic core "not" gate circuit 10 is fed from a main signal source E1 connected to a main signal input terminal 16. Appreciable signals from the main signal source E1 will appear at a signal output terminal 18 of the gate circuit 10 in the absence of control signals at a control signal input terminal 20, to be referred to as a "not" input terminal. When no signal appears at the "not" input terminal 20, then a signal output appears at the signal output terminal 18 originating in the main signal source E1.

The signal output terminal 18 of the "not" gate circuit 10 is connected via a line 21 to the "not" input terminal 20′ of the other "not" gate circuit 10′. The gate circuit 10′ has a main signal input terminal 16′ fed by a second main signal source E2. Appreciable signals from the main signal source E2 appear at a signal output terminal 18′ of the gate circuit 10′ in the absence of a signal input condition at the "not" input terminal 20′ thereof. Conversely, when a signal condition appears at the signal input terminal 20′, a no-signal output condition will appear at the signal output terminal 18′ of the gate circuit 10′. The signal output terminal 18′ of the gate circuit 10′ is connected via a line 23 to the "not" signal input terminal 20 of the first gate circuit 10, so that a bistable arrangement of gate circuits are provided, wherein the output conditions of each gate circuit controls the output conditions of the other gate circuit. In such case, if one of the gate circuits has a signal output condition, the signals fed therefrom to the "not" control input terminal of the other gate circuit will insure a no-signal output condition of the latter gate circuit. The no-signal condition of the latter gate circuit will insure a signal output condition of the former gate circuit. The signal output conditions of the two gate circuits may be reversed by any means which even momentarily changes the signal output condition of one of the gate circuits, since this will then result in a reversal of the output condition of the following gate circuit.

In the two-light system illustrated, the white light means 4 may comprise a source of voltage, not shown, which is connected to the white light W through the field contacts 2, in the case of normally open field contacts. In the case of normally closed field contacts, the field contacts may shunt the power source from the white light source W. Alternatively, field contacts may control a suitable power or current amplifier, unit such as a transistor current amplifier, which in turn directly controls the energized state of the white light source W. Each of these variations will be described hereinafter. Suffice it to say, that the white light means 4 is directly responsive to the position of the field contacts, and is independent of the output condition of the gate circuit 10 or 10'. The red light means 4', on the other hand, may be controlled solely from the output of the gate circuit 10', or it may be controlled both by the field contacts 2 and the output of the gate circuit 10', depending upon the particular design of the circuit in question. In any event, when the field contacts 2 are operated to their alarm indicating position, output signals are fed from the signal output terminal 18' of the gate circuit 10' to the red light means 4', which cause the red light R to burn brightly, either in a steady-on or flashing condition, depending upon the particular desires of the circuit designer. The initial alarm condition of the visual alarm means in the present example, would be that both the white and the red lights are burning brightly.

When the acknowledgement switch 8 is momentarily depressed, an inhibit signal source 32 is coupled to an inhibit signal input terminal 27. The inhibit signal appearing at the signal input terminal 27 effectively cancels out the effect of the signals fed to the signal input terminal 20 from the output of the gate circuit 12, so that, momentarily at least, the circuit acts as if no signal appeared at the signal input terminal 20. This creates a signal output condition at the signal output terminal 18 of the gate circuit 10. Since the signal output condition now appears at the "not" signal input terminal 20' of the gate circuit 10', a no-signal output condition then appears at the signal output terminal 18' thereof. In such case, release of the acknowledgement switch 8 would not result in the reversion of the gate circuit 10 to a no-signal output condition because the "not" signal input at the input terminal 20 has now disappeared. The states of operation of the gate circuits 10 and 10' have thus been reversed, resulting in the cessation of output signals fed to the red light means 4' from the output of the gate circuit 10'. The red light source R will then be de-energized. An acknowledged alarm state of the alarm lights will then be represented by the white light source W burning brightly and the red light source R extinguished. The white light source W is burning brightly because the field contacts 2 are still in an abnormal condition indicating position. When the variable being monitored returns to normal, the field contacts 2 will revert to their normal indicating position and the white light source W will become extinguished.

Figure 3:
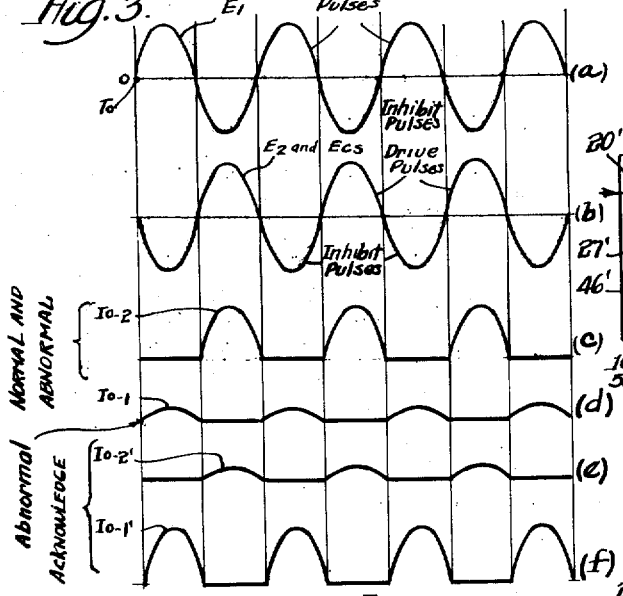
FIG. 3 shows various current and voltage waveforms t different parts of the circuit of FIG. 2, under various onditions of operation of the annunciator circuit.
Figure 2:
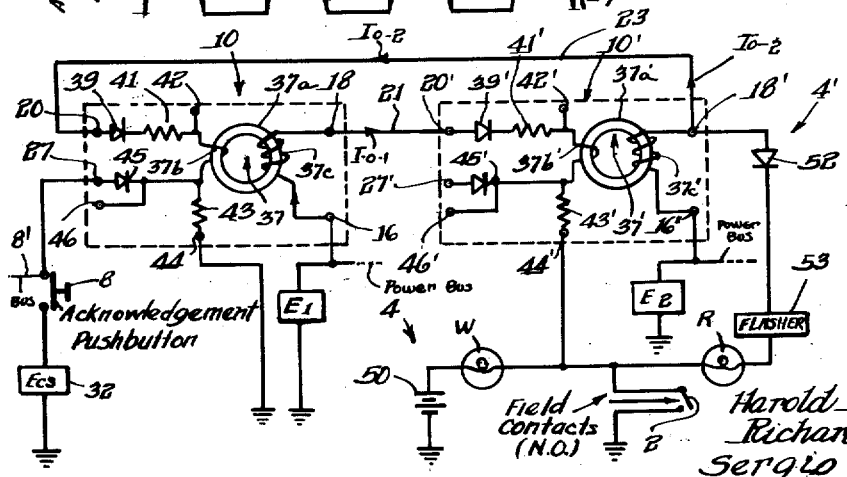
FIG. 2 is a detailed circuit diagram showing one form f the present invention utilized with normally open field ontacts.

Refer now to the schematic diagram of FIG. 2 which shows one form of annunciator circuit used with normally open field contacts. For the most part, the gate circuits in this and the other illustrated specific embodiments of the invention are identical, and corresponding elements will be similarly numbered, except perhaps for the addition of a prime (') following the reference number of a particular component. Practically all the components utilized exclusively for monitoring each variable are contained preferably in a pair of standard identical plug-in units forming the respective "not" gate circuits 10 and 10'. The various signal input and output terminals previously described in connection with the box diagram of FIG. 1 may be the prongs of respective male connectors at the bottoms of plug-in units, which connectors fit within female connectors secured to a common chassis or mounting base, not shown. The chassis may carry or are connected to respective power busses carrying the above-mentioned signal voltages. These busses or the generators connected thereto are thus the voltage sources E1 and E2 previously referred to. The busses make connection with the plug-in units through said male and female connectors. Voltage sources E1 and E2 may be any suitable alternating voltage sources providing pulses of sinusoidal or other shape, alternating in polarity. The alternating pulses of these sources are coincident but are of opposite phase or polarity, as shown by the exemplary sinusoidal voltage waveforms of FIGS. 3a and 3b. The positive pulses of these voltage source as will be explained, perform core driving functions an will be referred to as drive pulses, while the negati pulses thereof perform current inhibiting functions t be explained. A frequency or positive pulse repetitio rate of 100 kc. is desirable since it enables the use c relatively small core units.

Each of the plug-in units 10 or 10' has a magnetic co unit 37 or 37' which comprises a ring core 37a or 37 made of a material having a generally rectangular shape hysteresis curve shown in FIG. 4. The opposite saturate states of the core are represented by parallel horizont curve segments S and S' spaced evenly below and above zero flux line L1, and the unsaturated conditions of th core are represented by the steep segment lines US an US' similarly located on opposite sides of a zero mag netomotive force (M.M.F.) or ampere turns line L2 Each core 37a or 37a' has an input winding 37b or 37b and an output winding 37c or 37c'. Most preferably, th output winding has a substantially greater number o turns than the input winding. For a core having kne points x–2 and x–3 located respectively two and thre M.M.F. units from the zero M.M.F. line L1, a step-u turns ratio of one to five was found highly satisfactory Such a step-up ratio insures reliable operation of the cir cuit, without requiring external biasing means. In sucl case the no-signal condition of a core unit would drive it load core only to a point x–2' far below the near kne x–2 of the hysteresis curve.

A resistor 41 or 41' and a rectifier 39 or 39' are con nected in series between the upper end of the input wind ing 37b or 37b' and a "not" control signal input plug-i terminal 20 or 20' of the gate circuits 10 or 10'. Th bottom end of the input winding 37b or 37b' is connecte through a current limiting resistor 43 or 43' to a plug-i connector terminal 44 or 44'. Plug-in terminal 44 is con nected directly to ground through the socket terminal o the associated female connector, not shown, and the othe corresponding terminal 44' is connected to ground througl a normally open set of condition-responsive field contact 2. The junction of the dropping resistor 43 or 43' wit the bottom end of the input winding 37b or 37b' is con nected to the inhibit signal input plug-in terminal 27 o 27' of the plug-in unit 10 or 10' through rectifiers 45 o 45'. In the embodiment of the invention shown in FIG. 2, the inhibit signal input terminal 27' of the plug-in unit 10' is not used, but the inhibit signal input plug-in terminal 27 of the plug-in unit 10 is connected to an acknowledgement bus 8' to which the inhibit signal input terminals of all of the plug-in units 10 associated with other variables are connected. Pushbutton switch 8 is connected between the bus 8' and an inhibit signal source 32 which is connected to ground. The inhibit signal source, as will appear, may actually be the power bus associated with the signal source E2.

A signal input plug-in terminal 16 associated with the plug-in unit 10 is connected to the power bus associated with main signal source E1. The plug-in unit 10 has a signal output plug-in terminal 18 connected via the line 21 and the female connector of plug-in unit 10' to the "not" signal input plug-in terminal 20' of the plug-in unit 10'. The plug-in unit 10' has a signal output plug-in terminal 18' which is connected via the associated female connector and line 23 to the "not" signal input plug-in terminal 20 of the plug-in unit 10.

The white light means 4 comprises a circuit including a white light W and a suitable source of driving voltage 50 connected in series with one another across the field contacts 2. Closure of the field contacts 2 will, therefore, energize the white light W and opening of the field contacts will de-energize the white light W.

The right light means 4' is a circuit including a rectifier 52 connected through the female connector of plug-in unit 10' to the signal output plug-in terminal 18' of the plug-in unit 10'. A suitable flasher unit 53 and a red t R are connected in series between the rectifier 52 the ungrounded side of the field contacts 2. The her unit 53 may be any one of a number of well known her units. It may comprise a snap-action bimetallic nent, or it may comprise a small motor energized by output of the core unit 37' or externally energized ch motor drives a cam which alternately opens and ses a contact in the line in series with the red light R. The operation of the circuit of FIG. 2 may be explained follows. When the field contacts 2 are open, the energizing circuit for the white light W and the input cir- associated with the input winding 37b' of the right d core unit 37' are open, so that no current can flow he input winding 37b'. The energizing source 50 is so arized that the rectifier 39' in series with the input ding 37b' blocks any current flow therefrom. The rgization circuit for the red light R is also interrupted the open field contacts 2, so that the red light R is energized.

The main signal voltage source E2 connected in series h the output winding 37c' of the core unit 37' feeds rent through a path including signal input terminal , output winding 37c', feedback line 23, "not" signal in- terminal 20, rectifier 39, current-limiting resistor 41, ut winding 37b of the core unit 37, input load resistor and the terminal 44 connected to ground. The recti- 39 is polarized to block current flow resulting from the ative pulses of the output of the alternating main sig- source E2. The positive or drive pulses of the signal rce E2 are in a direction to drive the core 37a' of the e unit 37' into the reference state of saturation repre- ted by the curve segment S in FIG. 4, if the core is not eady in such state, or to maintain such state of satura- n if the core is already in this state of saturation. Be- se the energization circuit of the input winding 37b' normally open, the core 37a' will be continuously main- ned in the reference state of saturation. In such case, output winding acts like a practically zero impedance l large positive signal pulsations Io–2 (FIG. 3c) flow a result of the drive pulses from signal source E2 in the ut winding 37a of the first core unit 37. Gate circuit is thus normally open. The impedance in the afore- ntioned current path is such that there is sufficient rgy in each relatively large current pulsation passing ough the output winding 37c' of the core unit 37' to input winding 37b of the core unit 37 that the core of latter unit will be driven from point x–1 of its refer- e state of saturation, represented by the curved seg- nt S in FIG. 4, to the knee point x–3 of its opposite te of saturation represented by the curved segment S'. hen the current pulsation ends, the state of operation of core 37a is represented by point x–4.

The output winding 37c of the first core unit 37 is in oop circuit including main voltage source E1, rectifier , resistor 41', input winding 37b' of the second core it 37', resistor 43' and the field contacts 2'. The recti- 39' is arranged to pass the positive pulses of signal rce E1, which occur one-half cycle after the positive ve pulses of signal source E2. The negative pulses of nal source E1 inhibit or cancel out the effect of the lses induced into the output winding 37c of the first e unit 37 by the driving of the first core 37a from the erence state of saturation S to the second or opposite te of saturation S' (FIG. 4) by the drive pulses in input nding 37b.

When the field contacts 2 are open, no current can w in the output winding 37c and thus each subsequent rrent pulsation flowing through input winding 37b ll maintain the core 37a in its reference state of satura- n S'. When an abnormal condition of the variable ing monitored exists, field contacts 2 close to complete ergizing current paths for the red and white light R and and for the loop circuit including the output winding c and the input winding 37b'. The red light R will sh due to the flasher 53 and the white light W will be a steady bright light. A horn, not shown, may also be sounded. Then, the active or positive pulses from signal source E1 are operative to drive the core 37a from its opposite state of saturation just to the knee point x–5 on the curve segment. S representing the reference state of saturation. However, this will not change the signal output condition of the second core 37a' because during the resetting of the first core 37a to its reference state of saturation, its output winding 37c with its large number of turns relative to the input windings 37b' acts like a large impedance which limits current flow to the small or no-signal output condition represented by the relatively small pulses Io–1 shown in FIG. 3d. These small current pulsations Io–1 passing through the input winding 37b' of the second core unit 37' are in a direction tending to drive the second core 37a' from its operating point x–1 on the reference state of saturation curved segment S toward the opposite state of saturation. However, the small current passing through a small number of turns in the input winding 37b' will be insufficient to reach anywhere near even the nearest knee point x–2. The small current pulsations passing through the large number of turns in the output winding 37c will reset the core 37a and the signal sources E1 and E2 will continue to set and reset the core 37a during alternate half cycles until the acknowledgement pushbutton 8 is momentarily depressed. The gate circuit or plug-in unit 10 acts now like a closed gate and the gate circuit of plug-in unit 10' is still acting as an open gate providing an output signal condition which energizes the red light R.

If the above-mentioned small current pulsations Io–1 were to drive the core 37a' into its unsaturated state, yet to an insufficient degree to completely reverse the state of saturation of the core, difficulty would probably be encountered because the core would then be set to another state of saturation represented by the horizontal dotted line curved segment S–1. During the next half cycle, when the drive pulse of the main signal source E2 drives the core to the reference state of saturation S, a current pulsation will be generated which has insufficient energy to trigger the core unit 37a, which is the desired condition of operation of the circuit. An inversion of the operations of the two gate circuits 10 and 10' will result, which will completely destroy the proper operation of the annunciator unit. So, it is important that the relatively small or no-signal current pulsations not drive the core 37a beyond the nearest knee point x–2.

In the example now being illustrated, closure of the field contacts 2 does not actually disturb the output conditions of the "not" gate circuit 10'. It merely completed the paths of current flow to the lights. In accordance with a broader aspect of the invention, however, as will be described later on, closure of the field contacts may change the normal state of operation of a gate circuit which controls the red light from a no-signal output condition to a signal output condition thereby energizing the red light R. In such case, the red light R or a control circuit, therefore, need not have a path through the field contacts 2.

When the field contacts 2 initially close, an operator's attention would be attracted to a central control panel containing the lights W and R, either through the sounding of an audible alarm, not shown in FIG. 2, or by the flashing of the red light R. The operator then momentarily depresses the acknowledgement pushbutton 8 used in common with all of the annunciator circuits (each circuit comprises a pair of plug-ins 10 and 10' and associated lights) of the annunciator system. Depression of the pushbutton feeds the inhibit signal source 32 to the acknowledgement bus 8' and momentarily inhibits the "not" signal input of the first gate circuit 10 of each annunciator circuit. The inhibit signal may have the same phase and wave shape as the output of the main signal source E2 and may thus be represented by the waveform shown in FIG. 3b. The negative going pulsations thereof are blocked by the rectifier 45. Since the active or positive going pulsations of the output of the inhibit signal source 32 are in phase with the corresponding drive pulsations fed to the "not" input terminal 20 from the output of the second gate circuit 10', and these signals are applied to opposite ends of the input winding 37b, no current flows in the input winding 37b. The current-limiting resistor 41 connected between the upper end of the input winding 37b and the rectifier 39 serves the purpose of minimizing current flow due to any slight variations in the amplitude of the output of the control signal source 32 and the main signal source E2. When current flow is inhibited in the input winding 37b, the core 37a is not driven from its reference state of saturation S to its opposite state of saturation S', so that the next occurring resetting pulsation fed to the output winding 37c from the main signal source E1 will be in a direction to merely maintain the state of saturation of the core 37a in the state S. As above explained, in such case the output winding 37c will act as a substantially zero impedance, so that a relatively large current pulsation will flow at such time through the rectifier 39', current-limiting resistor 49', input winding 37b', input resistor 43' and the field contacts 2 extending to ground. This large current pulsation represents a signal output condition of the first gate circuit 10 which is now open, and are represented by a pulsation Io–1' shown in FIG. 3f. This large current flowing through the input winding 37b' will set the second core 37a' from its reference state of saturation S to its opposite state of saturation S' in the same way that the large current pulsations from the output circuit of the gate circuit 10' set the first core 37a from its reference state of saturation C to its opposite state of saturation S'. One-half cycle following each such setting of the magnetic core 37a' to its opposite state of saturation, a drive pulse of the main signal source E2 causes a resetting current to flow in the large number of turns of the output winding 57c', a resetting current of relatively small magnitude because of the large impedance offered by the large number of turns of the output winding 37c', so that the current output of the core unit 37' may then be represented by a pulsation of the waveform Io–2' shown in FIG. 3e. The gate 10' is now closed. This small current flowing through the small number of turns in the input winding 37b of the first core 37a will be insufficient to drive the core into its unsaturated state, and certainly to its opposite state of saturation S', so that the saturation of the core 37a is maintained by the active pulses generated by the main signal source E1. The voltage sources E1 and E2 will continue to set and reset the second core 37a', resulting in a maintenance of a no-signal output condition thereat, and signal source E1 continues to maintain the state of saturation of the core 37a resulting in a signal output condition thereat.

Since relatively little output appears at the signal output terminal 18' of the second core unit 37', insufficient power is available to operate the red light R even though the field contacts 2 are still closed. Thus, in the acknowledged state of operation of the annunciator unit, while an abnormal variable still exists the white light W will burn brightly and the red light R will be extinguished.

As core 37a' is triggered back and forth between the opposite states of saturation by the drive current pulses from signal sources E1 and E2 flowing respectively through input and output windings 37b' and 37c', voltage pulses are respectively induced in the windings 37c' and 37b' which are polarized to produce current pulses which can pass through rectifier 39 and 39'. Flow of such current pulses could adversely affect the operation of the circuit. The negative pulses of the main signal source E1 or E2 which is connected to the winding into which the unwanted voltage pulse is induced will oppose and cancel out the effect of these unwanted induced voltage pulses.

When the variable being monitored returns to normal, the field contacts 2 will open thereby disconnecting the input winding 37b' of the second core unit 37' from ground. This will effectively interrupt the flow of setting current for the core 37a', so that the next drive pulse generated by the main signal source E2 will maintain the state of saturation of the core 37a', resulting in a signal output condition of the core, for reasons apparent from the explanation of the circuit operation above explained. This, in turn, operates to provide large signal current pulsations represented by the waveform of FIG. 3c which will set the first core 37a to change the signal output condition thereof to a no-signal output condition. Opening of the field contacts 2 will, of course, extinguish the white light W.

FIG. 5 is a chart which illustrates the core and output conditions of the annunciator circuit for the various types of operation of the annunciator unit.

The annunciator light sequence just described can be changed to an annunciator sequence appearing like a conventional one-light flashing system by the simple expedient of mounting the white and red light bulbs W and R behind a common light-diffusing panel, such as panel P shown in FIG. 6. With this arrangement, it can be readily seen that during initial alarm operation, a flashing light will appear on the outside of the light-diffusing panel P due to the flashing red light R. After acknowledgement, the light will change to a steady indication because the red light R will be extinguished. In this case, the representations of red and white mean nothing since the ultimate color of light seen by the viewer is determined primarily by the color of the light-diffusing panel P.

When the field contacts are located a substantial distance from the annunciator equipment and large load currents from the lights R and W pass therethrough, a significant voltage drop may appear in the long lines extending to the field contacts. This voltage drop may, in some cases, affect the reliability of operation of the circuit because this voltage represents a biasing voltage which opposes the signal fed to the "not" input terminal 20' of the second plug-in unit 10', and therefore could render the circuit inoperable for its intended function. This situation can be avoided by replacing the red and white lights R and W by input circuits to current or power amplifiers. This type of circuit operation will now be described in connection with the embodiment of the invention shown in FIG. 7, where normally closed field contacts are utilized.

In the embodiment of FIG. 7, the identical plug-ins 10 and 10' are utilized which were just described in connection with the circuit diagram of FIG. 2. The connections and functions of the first plug-in unit 10 are identical to the connections and functions previously described in connection with FIG. 2. The arrangement of the output circuit of the second plug-in 10' controlling the energization of the red light R is somewhat modified, however. This circuit includes the above-mentioned rectifier 52 in series with a pair of resistors 56 and 58 connected to ground. The normally closed field contacts 2' are connected between ground and the junction point between resistors 56 and 58. This junction point is also connected to a base electrode 62 of a conventional transistor 63 of the so called NPN type. The collertor electrode 66 of the transistor is connected through the red light R to the positive terminal of a source of direct current voltage 50' whose negative terminal is grounded. The emitter electrode 64 is grounded. In a transistor amplifier of this type, when the base electrode is grounded, flow of current through the load of the transistor is cut off. When a positive voltage of proper amplitude is applied to the base electrode, the transistor conducts. The direction of signal current flow in the output circuit of the gate circuit 10' is in a direction to apply a positive voltage between the base electrode and ground, which the transistor connection shown will result in the flow current in the output circuit of the transistor.

The white light circuit is also controlled by a transis- r amplifier circuit. A resistor 82 is connected from e ungrounded end of the field contacts 2' to the base ectrode 84 of a transistor 86 of the NPN type. The nitter electrode 88 of the transistor 86 is connected to ound and the collector electrode 90 is connected to hite light W which connects with the positive termi- l of a direct current voltage source 50. A resistor is connected between positive terminal of the voltage urce 50 and the end of the resistor 82 nearest the ld contacts. With this arrangement, closure of the ld contacts will ground the base electrode 84 and erefore render the load circuit of the transistor non- nductive. When the field contacts are open, the posi- e voltage is supplied to the base electrode through the sistor 89 to initiate current flow in the output circuit the transistor, thereby turning on the white light W. When the acknowledgement button 8 is momentarily pressed, for reasons above explained, this changes the gnal output condition of the gate circuit 10 to a no- gnal output condition. In such case, since little or no rrent flows through the resistor 58 connected to the se electrode of the transistor 63, the base electrode be- mes effectively grounded which terminates current w in the load circuit of the transistor 63, thereby ex- guishing the red light R. The white light will con- ue to be lighted until the field contacts close. Then e base electrode 84 will be grounded to render the load cuit thereof non-conductive.

The embodiment of FIG. 7 also illustrates the manner which a common audible alarm in the form of a horn may be utilized in conjunction with a large number annunciator units similar to that just described. As eviously indicated, each variable being monitored will ve its own annunciator circuit. It would be economi- lly unfeasible to provide a separate horn for each nunciator unit. FIG. 7 shows a circuit wherein a gle horn 9 may be utilized in conjunction with any mber of annunciator units. The horn 9 is associated th a transistor 92 of the so called PNP type. The rn 9 is connected between the collector electrode 94 d ground. A source of positive potential 50'' is con- cted between the emitter electrode 96 and ground. t can be appreciated that all of the voltage sources , 50' and 50'' may be the same power supply and uld, in effect, be a rectified A.C. voltage.) The base ctrode 98 is connected in circuit with each of the nunciator units to be utilized. In the transistor circuit w being described, ground or negative potential ap- ed to the base electrode 96 will render the transistor tput circuit conductive and a positive potential will nder the output circuit non-conductive. Normally, a sitive voltage appears on the base electrode 98 be- use of the connection of the base electrode to the posi- e terminal of the voltage source 50'' through a resis- r 99. The connection between the base electrode 98 d each of the annunciator units includes respective ctifiers 100, 100', 100'', etc. in series with respective istors 102, 102', 102'', etc., extending respectively to collector electrode 66, etc., associated with the tran- tor controlling the energization of the respective red ht R thereof. The collector electrode 66 of each of transistor circuits controlling the associated red light effectively grounded when the transistor is in its con- cting state. Therefore, when the red light of any an- nicator unit is initially turned on, a ground potential ll be connected through the associated resistors 102, 2', or 102'', etc., and the associated rectifier 100, 0', or 100'', etc. to the base electrode 98 of the horn ntrolling transistor 92. The various rectifiers 100, 0', 100'', isolate the various annunciator units from e another.

Figure 8:
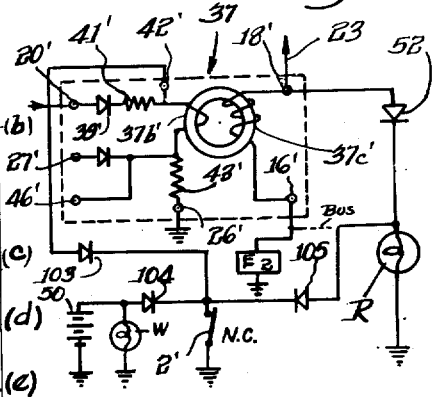
FIG. 8 shows another form of the present invention ranged to be operated with normally closed field concts.

Refer now to FIG. 8 which shows another form of the invention where normally closed signal contacts are utilized and the red and white lights are to be operated without the transistor amplifier circuits shown in FIG. 7. All the connections made through the left hand gate circuit 10 in such circuit are identical to that fully described in FIG. 2, and have therefore been omitted from FIG. 8, for purposes of simplicity. The connections made to the right hand gate circuit 10' in the embodiment of FIG. 8, however, are different from that shown in FIG. 2. In FIG. 8 the input resistor 43' connected to the bottom of the input winding of the core unit 37' is connected directly to ground instead of the field contacts. Also, the end of the red light R remote from the signal output terminal 18' is connected to ground instead of to the field contacts as is the end of the white light remote from voltage source 50. A connection is made from a plug-in terminal 42' connected at the juncture between the current-limiting resistor 41' and the upper end of the input winding of the core unit 37', through a rectifier 103 to the ungrounded end of the normally closed field contacts 2', so that all drive input signals to the input of the core unit 37' are grounded through the rectifier 103 and the field contacts 2' when the latter are closed. This will assure a no-signal input condition to the core unit 37' during normal operation of the system being monitored. Both the red and white lights are similarly bypassed during the closed condition of the field contacts by respective rectifiers 104 and 105 connected between the ungrounded ends of the white and red light bulbs W and R and the ungrounded end of the field contacts 2'. It can thus be seen that, when the field contacts 2' open, the red and white lights are turned on and the shunt circuit across the input winding of the core unit 37' is opened, to prepare the core for operation by signal pulses from the other gate circuit 10, when the acknowledgement pushbutton associated therewith is momentarily depressed by the operator. The circuit of FIG. 8 in all other respects operates like the circuit of FIG. 2.

Refer now to FIGS. 9 to 11 which relate to a substantially modified form of the invention. In the embodiments described above, the normal output condition of the gate circuit to which the alarm light means were connected was a signal output condition. By placing the field contacts in the output circuit in series or parallel with the red alarm light means, the signal output condition of the gate did not energize the red alarm light means during normal operation. In the embodiment now to be described, the alarm light means is associated with the gate circuit which normally does not have a signal output condition. In the case where normally open contacts are involved, closure of such contacts will change the output condition of the gate circuit controlling the alarm light means from a no-signal to a signal output condition. Then, when the acknowledgment switch is operated, the output conditions of the gate circuits will again be reversed to trigger the controlling gate circuit to a no-signal output condition, thereby extinguishing the red light associated therewith. The embodiment of FIG. 9 uses the standard plug-in units 10 and 10' previously described and, insofar as the left hand gate circuit 10 is concerned, all connections appearing in the embodiment of FIG. 2 will also be present in the embodiment of FIG. 9. Additionally, a plug-in terminal 46 is utilized in conjunction with a circuit which assures the no-signal output condition of the right hand gate circuit 10', when power is initially turned on. The terminal 46 is internally connected directly to the ungrounded end of the input resistor 43 and externally to a series circuit including a rectifier 106 and a resistor 108 connected to ground. A capacitor 110 is connected between the junction point of the resistor 108 and the rectifier 106 and a switch 107 which is ganged for operation with the main on-off power switch of the annunciator circuit, not shown. The switch 107, in turn, is connected to a source of suitable positive potential 50a, which may be of the same positive potential source utilized throughout the above-mentioned described embodiments of the invention. In this connection, it should also be noted that this power source might either be a source of direct current or pulsating current obtained by rectifying A.C. current. The time constant of the capacitor 110 and the resistor 108 is such that when the switch 107 is closed, a pulse of proper polarity and magnitude will appear across the resistor 108 of sufficient duration to inhibit or cancel out the effect of any setting signals fed to the "not" input terminal 20 of the gate circuit 10 from the output of the gate circuit 10'. Rectifier 106 is so polarized as to pass such pulse generated across the resistor 108.

As soon as the capacitor 110 charges up to the voltage output of the source 50a, then the pulse disappears from the resistor 108. The inhibit pulse so fed to the terminal 46 is applied to the bottom end of the input winding 37*b* of the core unit 37 to inhibit current flow of the input winding in the same way previously described in connection with the manner in which depression of the acknowledgement switch 8 inhibits current flow in the input winding. As above explained, such inhibit action will initiate a signal output condition at the signal output terminal 18, which signal output condition creates a no-signal output condition at the output of the gate circuit 10', as long as the input circuit to the input winding of the core unit 37' is complete. In the embodiment now being described, the bottom end of the input winding 37b' of the core unit 37' is grounded at all times.

The output circuit of the gate circuit 10' includes the rectifier 52 and the red light R connected to ground. Since, during normal operation of the system, a no-signal output condition exists at the output terminal 18', the red light R will not be energized. The white light W is connected between the positive terminal of voltage source 50 and ground. The negative terminal of the voltage source 50 is connected through a normally open set of condition-responsive field contacts 2 to ground. Thus, as long as the field contacts are open, the white light W will be extinguished.

The positive terminal of the voltage source 50 is connected through an isolating rectifier 112 and a capacitor 114 to the terminal 46' of the plug-in unit 10'. As previously indicated, the terminal 46' is connected to the bottom end of the input winding 37b' of the core unit 37'. The latter point, in turn, is connected to ground through the input load resistor 43'. By a proper proportioning of the capacitor 114 and resistor 43', a suitable time constant will be provided such that even momentary closure of the field contacts 2 will result in the generation of an inhibit pulse across the resistor 43', which is sufficient to inhibit flow of current in the input winding 37b' due to the input signals fed thereto from the output of the gate circuit 10, much in the same way that closure of the power switch 107 provided an inhibit signal which prevented current flow in the input winding 37b of the core unit 37. Rectifier 112 is polarized to pass a positive voltage pulse arcross the resistor 43' when the field contacts 2 are initially closed, due to an abnormal condition of the variable. This inhibit action, of course, will change the no-signal output condition of the gate circuit 10' to a signal output condition, and due to the feed back loop to the input of the gate circuit 10, will also result in the changing of the signal output condition of the gate circuit 10 to a no-signal output condition. With the initiation of a signal output condition at the signal output terminal 18' of the gate circuit 10', the red light R will be energized. Closure of the field contacts 2 will also result in the energization of the white light W.

The output signal of the signal output terminal 18' could, if it had sufficient power capabilities, also operate the common audible alarm 9 connected to the variou annunciator circuits through respective rectifiers 52' 52'', 52''', etc. If desired, both the red and white light and the horn can be controlled through transistor cir cuits analogously arranged like the transistor circuit previously described in connection with FIG. 7.

Upon momentary depression of the acknowledgemen switch 8, an inhibit action occurs at the input of the gat circuit 10 which inverts the output condition of the gat circuits 10 and 10'. Accordingly, the signal output con dition of the gate circuit 10' will be changed to a no signal output condition, thereby extinguishing the re light R, and the no-signal condition of the gate circui 10 will be converted to a signal output condition, fo reasons obvious from the explanation of the various cir cuits given.

One of the important features of the circuit shown i FIG. 9 is that the circuit effectively locks-in any initi alarm condition, even though the field contacts immed ately return to their open or normal position. As long a the field contacts are closed for a sufficient time to pro vide inhibit action, the signal output condition of the gat circuit 10' will be assured. However, since the field cor tacts 2 are not in the main path of current flow throug the input winding 37b' of the core unit 37', a reopenin of the field contacts 2 will have no effect on the red lig R. It will, however, extinguish the white light W. A any rate, even a momentary abnormal operation of th field contacts 2, will be locked in by the continue energization of the red light R, until the acknowledg ment switch 8 is depressed. In previously described en bodiments, before acknowledgement, as soon as the fie contacts 2' are in their normal positions, both alar lights will become extinguished. If the red and whi lights are mounted behind a light-diffusing panel P, shown in FIG. 6, then a normal lock-in light sequence wi be effected, if a flasher is associated with the red light I FIG. 9, accordingly, shows a suitable flasher 53 connect in circuit with the red light R.

FIG. 10 gives the various current and voltage wav forms in the annunciator circuit of FIG. 9, for the vario phases of operation thereof. The waveforms identifi by the reference characters Io–1, Io–1', and Io–1'' repr sent the output current pulsations of the gate circuits respectively during normal, abnormal and acknowledg operation of the annunciator unit. Similarly, the wav form identified by reference characters Io–2, Io–2', a Io–2'' represent the output current of the gate circui 10' respectively during normal, abnormal and acknow edged conditions of operation of the annunciator unit.

FIG. 11 is a chart which gives a resume of conditio of the core units 37 and 37' with the various symbols the chart having the same meaning as shown in FIG.

It should be understood that numerous other modific tions may be made of the preferred form of the inventi above described, without deviating from the broad aspects of the invention.

As an illustrative but not limiting example, in t broad general aspect of the invention, the magnetic co control circuits of the invention need not have a comm reference or ground point for the various cascaded ma netic core control circuits, as shown in FIGS. 1 and 4– and the signal source need not be separate sources ea having a pair of output terminals, one grounded and t other not, across which a voltage of opposite phase to t voltage across the output terminals of the other sig source appear. Rather, the voltage sources, symbolical shown by the numbered circles, could be a single sour with only two output terminals across which an ternating voltage appears. Each terminal can be said provide an alternating voltage with respect to a theoreti or phantom ground which is opposite to the voltage b tween the opposite terminal and phantom ground. such case, the terminals 26—32 and 26'—32' of ea plug-in unit 10 or 10' are respectively connected togeth l the joined terminals of the plug-in units 10 and 10' connected to opposite terminals of the single two ninal voltage source 50.

n the claims, the reference to separate main signal rces generally includes the terminals of separate sig- source or the respective terminals of a single source ing a phantom ground, as above explained. Also, the rence to an input or output terminal does not neces- ly mean the plug-in unit input or output terminals rred to, but includes any input or output connection nt leading to the magnetic core unit involved.

Ve claim as our invention:

. An annunciator unit comprising: a first and a second gnetic core "not" gate circuit, each "not" gate circuit uding a magnetic core unit with windings thereon, a n signal input terminal, a "not" control signal input ninal and a signal output terminal, main signal voltage ns connected to said main signal input terminals of first and second "not" gate circuits, said first and sec- magnetic "not" gate circuits each further including ns connecting said various associated terminals to the ciated core windings so that a signal output condition ts where appreciable signals from said signal voltage ns appear at the associated signal output terminal if a ignal condition exists at the associated control signal t terminal, and a no-signal output condition exists at associated signal output terminal if an uninhibited al condition exists at the associated "not" signal input ninal, means connecting said signal output terminal of first "not" gate circuit to the "not" input terminal of second "not" gate circuit, whereby the output condi- of the first "not" gate circuit controls the output lition of said second "not" gate circuit, means con- ing said signal output terminal of said second "not" circuit to the "not" input terminal of said first "not" circuit, whereby the output condition of said second " gate circuit controls the output condition of said "not" gate circuit, field switch means connected to at one of said "not" gate circuits for controlling the ut condition thereof and responsive to the condition variable to be monitored, said field switch means ng opposite positions indicating respectively a normal an abnormal condition of the variable said "not" gate its having a given initial output condition when said switch means is initially in a normal indicating posi- visual alarm means for providing a normal, an l abnormal, and an acknowledged abnormal indica- said visual alarm means being connected to said field h means and to said signal output terminal of said d "not" gate circuit, said field switch means, when s normal indicating position, operating said visual n means to its normal indicating condition, and, in its abnormal indicating position, effecting the ation of said visual alarm means to its initial ab- al indicating condition, acknowledgement switch s for selectively providing a signal condition at the ' input terminal of the "not" gate circuit which has nal output condition whereby a no-signal output ition is produced thereat, said visual alarm means be- esponsive to said last-mentioned change in the output ition of said latter gate circuit and to the alarm in- ing position of said field switch means by providing acknowledged alarm indication, and said field switch s operating said last mentioned gate circuit to said l output condition during the operation thereof to of said positions.

[An annunciator unit comprising:] *In an annunci- system for monitoring a number of variables,* a first a second magnetic core "not" gate circuit *for each ble,* each "not" gate circuit including a magnetic core with windings thereon, a main signal input terminal, t" control signal input terminal and a signal output nal, main signal voltage means connected to said signal input terminals of said first and second "not" circuits, said first and second magnetic "not" gate circuits each further including means connecting said various associated terminals to the associated core windings so that a signal output condition exists where appreciable signals from said signal voltage means appear at the associated signal output terminals if a no-signal condition exists at the associated control signal input terminal, and a no-signal output condition exists at the associated signal output terminal if an uninhibited signal condition exists at the associated "not" signal input terminal, means connecting said signal output terminal of said first "not" gate circuit to the "not" input terminal of said second "not" gate circuit, whereby the output condition of the first "not" gate circuit controls the output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means *for each variable* connected to at least one of *the associated* [said] "not" gate circuits for controlling the output condition thereof and responsive to the condition of *the associated* [a] variable to be monitored, *each* [said] field switch means having opposite positions indicating respectively a normal and an abnormal condition of the *associated* variable, visual alarm means *for each variable* for providing a normal, an initial abnormal, and an acknowledged abnormal indication, *each* [said] visual alarm means *including at least one electrical light source* [being] connected *directly* to *the associated* [said] field switch means and to said signal output terminal of *the associated* [said] second "not" gate circuit, *each* [said] field switch means, when in its normal indicating position, operating *the associated* [said] visual alarm means including said electrical light source to its normal indicating condition, and, when in its abnormal indicating position, effecting the operation of *the associated* [said] visual alarm means to its initial abnormal indicating condition by a given output condition of *the associated* [said] second "not" gate circuit, said field switch means operating said second "not" gate circuit to said given output condition during the operation thereof to one of said indicating positions, acknowledgement switch means for selectively momentarily providing a signal condition at the "not" input terminal of *each* [the] "not" gate circuit having a signal output condition when the *associated* field switch means is in its alarm indicating position to change said given output condition of *the associated* [said] second "not" gate circuit, to terminate the operation of *the associated* [said] visual alarm means in its initial alarm indicating condition, and *each* [said] field switch means, while in its alarm indicating position and subsequent to the operation of said acknowledgement switch means, operating *the associated* [said] visual alarm means to said acknowledged alarm indicating condition.

3. [An annunciator unit comprising:] *In an annunciator system for monitoring a number of variables,* a first and a second magnetic core "not" gate circuit *for each variable,* each "not" gate circuit including a magnetic core unit with windings, thereon, a main signal input terminal, a "not" control signal input terminal and a signal output terminal, main signal voltage means connected to said main signal input terminals of said first and second "not" gate circuits, said first and second magnetic "not" gate circuits each further including means connecting said various associated terminals to the associated core windings so that a signal output condition exists where appreciable signals from said signal voltage means appear at the associated signal output terminal if a no-signal condition exists at the associated control signal input terminal, and a no-signal output condition exists at the associated signal output terminal if an uninhibited signal condition exists at the associated "not" signal input terminal, means connecting said signal output terminal of said first "not" gate circuit to the "not" input terminal of said second "not" gate circuit, whereby the output condition of the first "not" gate circuit controls the output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means *for each variable* connected to at least one of *the associated* [said] "not" gate circuits for controlling the output condition thereof and responsive to the condition of *the associated* [a] variable to be monitored, *each* [said] field switch means having opposite positions indicating respectively a normal and an abnormal condition of the *associated* variable, visual alarm light means *for each variable* for providing a normal, an initial abnormal, and an acknowledged abnormal light indication, *each* [said] visual alarm means *including at least one electrical light source* [being] connected *directly* to *the associated* [said] field switch means and to said signal output terminal of *the associated* [said] second "not" gate circuit, *each* [said] field switch means, when in its normal indicating position, operating *the associated* [said] visual alarm means to its normal indicating condition, and, when in its abnormal indicating position, effecting the operation of *the associated* [said] visual alarm means to its initial abnormal indicating condition by a given output condition of *the associated* [said] second "not" gate circuit, said field switch means operating said second "not" gate circuit to said given output condition during the operation thereof to one of said indicating positions, acknowledgement switch means for selectively momentarily providing a signal condition at the "not" input terminal of the *associated* "not" gate circuit having a signal output condition when the *associated* field switch means is in its alarm indicating position to change said given output condition of *the associated* [said] second "not" gate circuit, to terminate the operation of *the associated* [said] visual alarm means in its initial alarm indicating condition, and *each* [said] field switch means, while in its alarm indicating position and subsequent to the operation of said acknowledgement switch means, operating *the associated* [said] visual alarm means to said acknowledged alarm indicating condition.

4. An annunciator unit comprising: a first and a second magnetic core "not" gate circuit, each "not" gate circuit including a magnetic core unit with windings thereon, a main signal input terminal, a "not" control signal input terminal and a signal output terminal, at least said first "not" gate circuit also having an inhibit control signal input terminal, a main signal voltage means connected to said main signal input terminals of said first and second "not" gate circuits, said first and second magnetic core "not" gate circuits each further including means connecting said various associated terminals to the associated core windings so that a signal output condition exists where appreciable signals from said signal voltage means appear at the associated signal output terminal if a signal condition exists at both said "not" and inhibit signal input terminals, and if a no-signal condition exists at both said associated "not" and inhibit signal input terminals, and a no-signal output condition exists at the associated signal output terminal if a signal condition exists at the associated "not" signal output terminal and a no-signal condition exists at the associated inhibit signal input terminal, means connecting said signal output terminal of siad first "not" gate circuit to the "not" input terminal of said second "not" gate circuit, whereby the output conditions of the first "not" gate circuit controls the signal output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means connected to at least one of said "not" gate circuits for controlling the output condition thereof and responsive to the condition of a variable to be monitored, said field switch means having opposite positions indicating respectively a normal and an abnormal condition of the variable, visual alarm means for providing a normal, an initial abnormal, and an acknowledged abnormal indication, said visual alarm means being connected to said field switch means and to said signal output terminal of said second "not" gate circuit, said field switch means, when in its normal indicating position, operating said visual alarm means to its normal indicating condition, and, when in its abnormal indicating position, effecting the operation of said visual alarm means to its initial abnormal indicating condition by a given output condition of said second "not" gate circuit, said field switch means operating said second "not" gate circuit to said given output condition during the operation thereof to one of said indicating positions, acknowledgement switch means for selectively providing a signal condition at the inhibit signal input terminal of the "not" gate circuit having a signal output condition when the field switch means is in its alarm indicating position to change the signal output condition of said second "not" gate circuit, to terminate the operation of said visual alarm means in its initial alarm indicating condition, and said field switch means, while in its alarm indicating position and subsequent to the operation of said acknowledgement switch means, operating said visual alarm means to said acknowledged alarm indicating condition.

5. An annunciator unit comprising: a first and a second magnetic core "not" gate circuit, each "not" gate circuit including a magnetic core unit with windings thereon, a main signal input terminal, a "not" control signal input terminal and a signal output terminal, main signal voltage means connected to said main signal input terminals of said first and second "not" gate circuits, said first and second magnetic "not" gate circuits each further including means connecting said various associated terminals to the associated core windings so that a signal output condition exists where appreciable signals from said signal voltage means appear at the associated signal output terminal if a no-signal condition exists at the associated control signal input terminal, and a no-signal output condition exists at the associated signal output terminal if an uninhibited signal condition exists at the associated "not" signal input terminal, means connecting said signal output terminal of said first "not" gate circuit to the "not" input terminal of said second "not" gate circuit, whereby the output condition of the first "not" gate circuit controls the output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means connected to at least one of said "not" gate circuits for controlling the output condition thereof and responsive to the condition of a variable to be monitored, said field switch means having opposite positions indicating respectively a normal and an abnormal condition of the variable, first visual alarm means for providing at least two different visual indications, second visual alarm means for providing at least two different visual indications, said field switch means being connected to operate said first visual alarm means independently of said gate circuits to one of its visual indications when said field switch means is in its abnormal indicating position and to its other visual indication when said field switch means is in its normal indicating position, said second visual alarm means being connected to said signal output terminal of said second "not" gate circuit, said field switch means in its abnormal indicating position effecting the operation of said second visual alarm means to one of its visual indications by a given output condition of said second "not" gate circuit;

said second visual alarm means having its other visual indication when opposite output condition exists in the output of said second "not" gate circuit, said field switch means operating said second "not" gate circuit to said given output condition during the operation thereof to one of said indicating positions, and acknowledgment switch means for triggering said second "not" gate circuit to said opposite output condition of said second "not" gate circuit, to effect the operation of said second visual alarm means to said other visual indication.

6. An annunciator unit comprising: a first and a second magnetic core "not" gate circuit, each "not" gate circuit including a magnetic core unit with windings thereon, a main signal input terminal, a "not" control signal input terminal and a signal output terminal, main signal voltage means connected to said main signal input terminals of said first and second "not" gate circuits, said first and second magnetic "not" gate circuits each further including means connecting said various associated terminals to the associated core windings so that a signal output condition exists where appreciable signals from said signal voltage means appear at the associated signal output terminal if a no-signal condition exists at the associated control signal input terminal, and a no-signal output condition exists at the associated signal output terminal if an uninhibited signal condition exists at the associated "not" signal input terminal, means connecting said signal output terminal of said first "not" gate circuit to the "not" input terminal of said second "not" gate circuit, whereby the output condition of the first "not" gate circuit controls the output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means connected to at least one of said "not" gate circuits for controlling the output condition thereof and responsive to the condition of a variable to be monitored, said field switch means having opposite positions indicating respectively a normal and an abnormal condition of the variable, first alarm light means including a first light source for providing at least two different visual indications, one of which is a bright steady light indication, second alarm light means including a second light source for providing at least two different visual indications, one of which is a bright flashing light indication, said field switch means being connected to operate said first alarm means independently of said gate circuits to its steady bright light indication when said field switch means is in its abnormal indicating position and to its other visual indication when said field switch means is in its normal indicating position, sad second alarm light means being connected to said signal output terminal of said second "not" gate circuit, said field switch means in its abnormal indicating position effecting the operation of said second alarm light means to its bright-flashing indication by the output signals from said signal output terminal of said second "not" gate circuit, said second alarm light means having its other visual indication when a no-signal condition exists in the output of said second "not" gate circuit, acknowledgment switch means for providing a signal condition at the "not" input terminal of said second "not" gate circuit to cancel the signal output condition of said second "not" gate circuit, to effect the operation of said second alarm light means to said other visual indication.

7. An annunciator unit comprising: a first and a second magnetic core "not" gate circuit, each "not" gate circuit including a magnetic core unit with windings thereon, a main signal input terminal, a "not" control signal input terminal and a signal output terminal, main signal voltage means connected to said main signal input terminals of said first and second "not" gate circuits, said first and second magnetic "not" gate circuits each further including means connecting said various associated terminals to the associated core windings so that a signal output condition exists where appreciable signals from said signal voltage means appear at the associated signal output terminal if a no-signal condition exists at the associated control signal input terminal, and a no-signal output condition exists at the associated signal output terminal if an uninhibited signal condition exists at the associated "not" signal input terminal, means connecting said signal output terminal to said first "not" gate circuit to the "not" input terminal of said second "not" gate circuit, whereby the output condition of the first "not" gate circuit controls the output condition of said second "not" gate circuit, means connecting said signal output terminal of said second "not" gate circuit to the "not" input terminal of said first "not" gate circuit, whereby the output condition of said second "not" gate circuit controls the output condition of said first "not" gate circuit, field switch means connected to at least one of said "not" gate circuits for controlling the output condition thereof and responsive to the condition of a variable to be monitored, said field switch means having opposite positions indicating respectively a normal and an abnormal condition of the variable, first alarm light means including a first light source for providing at least two different visual indications, one of which is a bright steady light indication, second alarm light means including a second light source for providing at least two different visual indications, one of which is a bright-flashing indication, a common light diffusing panel behind which said first and second light sources are mounted so that respective unitary flashing bright and steady bright indications are provided when the two light sources are respectively lighted together and when only the first light source is brightly lit, said field switch means being connected to operate said first alarm means independently of said gate circuits to its steady bright light indication when said field switch means is in its abnormal indicating position and to its other visual indication when said field switch means is in its normal indicating position, said second alarm light means being connected to said signal output terminal of said second "not" gate circuit, said field switch means in its abnormal indicating position effecting the operation of said second alarm light means to its bright-flashing indicating by a given output condition of said second "not" gate circuit, said second alarm light means having its other visual [indicating] *indication* when the opposite output condition exists in the output of said second "not" gate circuit, said field switch means operating said second "not" gate circuit to said given output condition during the operation thereof to one of said indicating positions and acknowledgement switch means for triggering said second "not" gate circuit to said opposite output condition to effect the operation of said second alarm light means to said other visual indication.

[8. An annunciator unit comprising: a first control circuit including first static means having first and second opposite output states, a second control circuit including second static means having first and second opposite output states corresponding respectively to said first-mentioned output states, means interconnecting said control circuits, so that the two static means have non-corresponding output states at any given condition of the annunciator unit, wherein changing of the output state of either static means will normally automatically result in a corresponding change in the state of the other static means, means responsive directly to the condition of a variable to be monitored and having a normal and an abnormal condition indicating state, said condition responsive means setting said static means into a given output state of operation when said variable is normal, visual alarm means having a normal, initial alarm and acknowledged alarm states of operation and responsive to at least one change in the output state of one of said static means, said control circuits including means responsive to the change of said condition responsive means from its normal to its abnormal condition indicating state by operating said visual alarm means to said initial alarm state of operation, and responsive to the change of said condition responsive means from its abnormal to its normal state by operating said visual alarm means to its normal state of operation, manually operable acknowledgement means, means responsive to the momentary actuation of said manually operable acknowledgement means for reversing the states of operation of said first and second static means, and means responsive to the change in the output states of operation of said first and second static means upon operation of said acknowledgement means by operating said visual alarm means to said acknowledged state of operation therof.]

[9. An annunciator unit comprising: a first control circuit including first magnetic core means having first and second output states, a second magnetic core control circuit including second magnetic core means having first and second opposite output states corresponding respectively to said first-mentioned output states, means interconnecting said control circuits so that the two magnetic cores have non-corresponding output states at any given condition of the annunciator unit, wherein changing of the output state of either magnetic core will normally automatically result in a corresponding change in the output state of the other magnetic core means, condition responsive directly to the condition of a variable to be monitored and having a normal and an abnormal condition indicating state, visual alarm means having a normal, initial alarm and acknowledged alarm states of operation and responsive to at least one change in the output state of one of said magnetic cores, said control circuits each including means responsive to the change of said condition responsive means from its normal to its abnormal condition indicating state by operating said visual alarm means to said initial alarm state of operation, means responsive to the actuation of said manually operable acknowledgement means for reversing the states of operation of said first and second cores, and means responsive to the change in the output states of operation of said first and second cores upon operation of said acknowledgement means by operating said visual alarm means to said acknowledged state of operation thereof.]

10. [An annunciator unit comprising:] *In an annunciator system for monitoring a number of variables,* a bistable control circuit *for each variable* including first static means having first and second opposite output states, a second control circuit *for each variable* including second static means having first and second opposite output states corresponding respectively to said first-mentioned output states, means *for each variable* interconnecting said control circuits so that the two static means have mutually maintained output states, and wherein changing of the output state of either static means will normally automatically result in a corresponding change in the state of the other static means, means *for each variable* responsive directly to the condition of a variable to be monitored and having a normal and an abnormal condition indicating state, visual alarm means *for each variable* having a normal, initial alarm and acknowledged alarm states of operation, and control circuit means *for each variable* including means responsive to the change of said condition responsive means from its normal to its abnormal condition indicating state by operating *the associated* [said] visual alarm means to said initial alarm state of operation, manually operable acknowledgement means, means *for each variable* responsive to the actuation of said manually operable acknowledgement means for reversing the states of operation of *the associated* [said] first and second static means, and means *for each variable* responsive to the change in the output states of operation of *the associated* [said] first and second static means upon operation of said acknowledgement means by operating *the associated* [said] visual alarm means to said acknowledged state of operation thereof.

[11. An annunciator unit comprising: a first control means including first static means having first and second opposite output states, second control means including second static means having first and second opposite output states corresponding respectively to said first-mentioned output states, means interconnecting said control means so that the two static means have non-corresponding output states at any given condition of the annunciator unit, wherein changing of the output state of either static means will normally automatically result in a corresponding change in the state of the other static means, condition responsive means responsive directly to the condition of a variable to be monitored and having a normal and an abnormal condition indicating state, first and second visual alarm means each providing at least two different visual indications, said condition responsive means when in said normal indicating state operating said first visual alarm means so as to provide a first visual indication, and, when in said abnormal indicating state operating said first visual alarm means so as to provide a second visual indication independently of said control means, said condition responsive means setting one of said control means into one of its states of operation when the same is operated between one of said indicating states to the other, manually operable acknowledgement means said second alarm means being operated into one of the visual indications when said condition responsive means is operated to its abnormal indicating state, means responsive to the actuation of said acknowledgement means for reversing the output states of said first and second static means, and means responsive to the last-mentioned change in the output states of said first and second static means for operating said second visual alarm means from said one visual indication to another visual indication.]

[12. An annunciator apparatus comprising first and second visual alarm means each having de-energized normal and energized alarm conditions of operation, a source of voltage, bistable control means comprised of static control elements having a first state of operation which effects the operation of said second visual alarm means to said de-energized normal condition of operation and a second state of operation which effects the operation of said second visual alarm means to said energized abnormal condition of operation, condition responsive switch means responsive to the variable to be monitored and having normal and abnormal states of operation when the variable is respectively normal and abnormal, said condition responsive switch means when in said abnormal state of operation connecting said source of voltage into operative relation with said first visual alarm means to energize the same and effecting the energization of said second visual alarm means by said control means when operating in its second state of operation, means for operating said control means in said second state of operation at least during the time said condition responsive switch means is initially operated to its abnormal state of operation, and manually operable acknowledgement switch means for triggering said bistable control means independently of said condition responsive switch means into said first state of operation thereof where said second visual alarm means is de-energized, said bistable control means being operated into said second state of operation when said condition responsive switch means is operated into one of said states of operation.]

13. An annunciator unit comprising: a first and a second "not" gate circuit, each "not" gate circuit including a main signal input terminal, a "not" control signal input terminal and a signal output terminal, main signal voltage means connected to said main signal input terminals of said first and second "not" gate circuits, said first and second "not" gate circuits each further including means for providing a signal output condition when appreciable signals from said signal voltage means appear at the associated signal output terminal if a no-signal condition exists at the associated control signal input terminal, and a no-signal output condition at the asso lated signal output terminal if an uninhibited signal ondition exists at the associated "not" signal input terminal, means connecting said signal output terminal of aid first "not" gate circuit to the "not" input terminal f said second "not" gate circuit, whereby the output ondition of the first "not" gate circuit controls the output condition of said second "not" gate circuit, means onnecting said signal output terminal of said second not" gate circuit to the "not" input terminal of said first not" gate circuit, whereby the output condition of said econd "not" gate circuit controls the output condition of aid first "not" gate circuit, field switch means connected at least one of said "not" gate circuits for controlling e output condition thereof and responsive to the condition of a variable to be monitored, said field switch eans having opposite positions indicating respectively normal and an abnormal condition of the variable, first isual alarm means for providing at least two different isual indications, second visual alarm means for providing at least two different visual indications, said field vitch means being connected to operate said first visual arm means independently of said gate circuits to one of s visual indications when said field switch means is in s abnormal indicating position and to its other visual dication when said field switch means is in its normal dicating position, said second visual alarm means being onnected to said signal output terminal of said second not" gate circuit, said field switch means in its abnormal dicating position effecting the operation of said second sual alarm means to one of its visual indications by e output signals from said signal output terminal of said cond "not" gate circuit, said second visual alarm means aving its other visual indication when a no-signal condion exists in the output of said second "not" gate circuit, cknowledgement switch means for providing a signal ondition at the "not" input terminal of said second "not" te circuit to cancel the signal output condition of said cond "not" gate circuit, to effect the operation of said cond visual alarm means to said other visual indication.

14. An annunciator unit comprising: a first and a secd "not" gate circuit each including a main signal int terminal, a "not" control signal input terminal and signal output terminal, main signal voltage means conected to said main signal input terminals of said first d second "not" gate circuits, said first and second "not" te circuits each further including means for providing signal output condition where appreciable signals from id signal voltage means appear at the associated sigl output terminal if a no-signal condition exists at the sociated control signal input terminal, and a no-signal tput condition at the associated signal output terminal a signal condition exists at the associated "not" sigl input terminal, means connecting said signal output rminal of said first "not" gate circuit to the "not" put terminal of said second "not" gate circuit, where the output condition of the first "not" gate circuit conols the output condition of said second "not" gate cirit, means connecting said signal output terminal of id second "not" gate circuit to the "not" input terinal of said first "not" gate circuit, whereby the out t condition of said second "not" gate circuit controls e output condition of said first "not" gate circuit, field itch means connected to at least one of said "not" te circuits for controlling the output condition thereof d responsive to the condition of a variable to be monired, said field switch means having opposite positions dicating respectively a normal and an abnormal contion of the variable, said field switch means when in normal indicating position providing a signal output ndition at the signal output terminal of said second ot" gate circuit, first visual alarm means for providing least two different visual indications, second visual arm means for providing at least two different visual dications respectively when coupled and uncoupled to e output of said second "not" gate circuit, said field switch means being connected to operate said first visual alarm means independently of said gate circuits to one of its visual indications when said field switch means is in its abnormal indicating position and to its other visual indication when said field switch means is in its normal indicating position, circuit means connected between said field switch means and said second visual alarm means for coupling the second visual alarm means to the output terminal of said second gate circuit when said field switch means is in its abnormal indicating position and uncoupling the second visual alarm means from said output of the second gate circuit when the field switch means is in its normal indicating position, and acknowledgment switch means for providing a signal condition at the "not" input terminal of said second "not" gate circuit to cancel the signal output condition of said second "not" gate circuit when said field switch means is in its abnormal indicating position to change the operation of said second visual alarm means.

[15. Annunciator apparatus comprising first and second visual alarm means each operative from a first normal indication to a second alarm indication, condition responsive means responsive to the condition of said variable to be monitored and having a first normal indicating condition when the variable to be monitored is normal and a second abnormal indicating condition when the variable is abnormal, control means for operating said second visual alarm means in its second alarm indication when the control means is in a first state of operation and said condition responsive means is in its abnormal indicating condition and for removing said second alarm indication when the control means is in a second state of operation, said first alarm means being responsive to operation of said condition responsive means to said abnormal indicating condition independently of the state of operation of said control means, said control means being operated to its first state of operation when the condition responsive means is operated to one of said conditions of operation thereof, and manually operable acknowledgment means for selectively operating said control means independently of the operating condition of said condition responsive means to said second state of operation where the second alarm indication of said second visual alarm means is removed.]

[16. An annunciator circuit comprising first and second visual alarm light means each having a de-energized normal condition of operation and an energized alarm condition of operation, operating voltage means for energizing said visual alarm light means, condition responsive switch means responsive to the condition of the variable to be monitored and having a normal indicating condition when the variable is normal and an abnormal indicating condition when the variable is abnormal, bistable control means comprised of static control elements which effects the energization of said second visual alarm light means when the control means is in a first state of operation and said switch means is in its abnormal indicating position and effects the de-energization of said second visual alarm light means when the control means is in a second state of operation, mean connecting said first visual alarm light means, said operating voltage means and said condition responsive switch means into a first circuit whereby the first visual alarm light means will be de-energized when the condition responsive switch means is in its normal indicating condition and is energized when the condition responsive switch means is in its abnormal indicating condition, said first circuit operating independently of said control means, and means connecting said condition responsive switch means, operating voltage means and said control means in a second circuit where the control means is operated to its first state of operation when the condition responsive switch means is operated to said abnormal indicating condition thereof, and manually operable acknowledgment switch means for selectively operating said control means to said second state of operation independently of said condition responsive switch means.]

[17. An annunciator circuit comprising first visual alarm means including a light unit, second visual alarm means including a light unit, a common translucent panel behind which said light units are mounted to provide an apparently single light indication which is a resultant effect of the two above-mentioned light units, control means for controlling the operation of said second visual alarm means and having two states of operation, said control means in one of said states of operation thereof being adapted alternately to energize and de-energize at a visible flashing rate and in the other state of operation thereof de-energizing the same, condition responsive means for controlling the operation of said first visual alarm means and said control means and having a normal indicating condition when the variable to be monitored is normal and an abnormal indicating condition when the variable is abnormal, means for steadily energizing said first visual alarm means when said condition responsive means is initially operated to said abnormal indicating condition and rendering said control means operative alternately to energize and de-energize said second visual alarm means whereby an overall flashing indication is provided, one of said conditions of said condition responsive means operation said control means into said state of operation which is adapted to energize said second visual alarm means, and acknwledgment means for operating said control means to said other state of operation to de-energize the flashing second visual alarm means to provide a steady bright indication from the light unit of said first visual alarm means if the variable being monitored is still abnormal.]

18. An annunciator circuit comprising first normally de-energized visual alarm means including a light unit and adapted to provide a steady bright light indication of said latter light unit when energized, second normally de-energized visual alarm means including a light unit and adapted to provide a flashing light indication on said light unit when energized, a common translucent panel behind which said light units are mounted to provide an apparently single light indication which is a resultant effect of the two above mentioned light units, control means for controlling the operation of at least said second visual alarm means and comprised of a two stage feedback circuit formed by a pair of static control elements arranged to have two mutually maintained states of operation and to reverse their respective states of operation when momentarily triggered into an opposite state of operation, said control means in one of said states of operation thereof being adapted to energize said second flashing visual alarm means, and in the other state of operation thereof de-energizing the same, condition responsive means for controlling the operation of said control means and having a normal indicating condition when the variable to be monitored is normal and an abnormal indicating condition when the variable is abnormal, means for rendering said control means operative to energize said second flashing visual alarm means when said condition responsive means is initially operated to its abnormal indicating condition, and acknowledgement means for triggering saidc ontrol means to said other state of operation to de-energize the second flashing alarm means for triggering said control means to said other state state when said condition responsive means is in said abnormal indicating condition and said control means is in said other state of operation to provide an acknowledged alarm indication.

[19. An annunciator circuit comprising first normally de-energized visual alarm means, a second normally de-energized visual alarm means, control means for controlling the operation of at least said second visual alarm means and comprised of a two stage feedback circuit formed by a pair of static control elements arranged to have two mutually maintained states of operation and to reverse their respective states of operation when mo mentarily triggered into an opposite state of operation said control means in one of said states of operatio thereof being adapted to energize said second visual alarn means, and in the other state of operation thereof de energizing the same, condition responsive means for con trolling the operation of said control means and having normal indicating condition when the variable to b monitored is normal and an abnormal indicating conditio when the variable is abnormal, means for rendering sai control means operative to energize said second visua alarm means when said condition responsive means i initially operated to its abnormal indicating condition, an acknowledgement means for triggering said control mean to said other state of operation to de-energize the secon visual alarm means, said first visual alarm means bein in its energized state when said condition responsiv means is in said abnormal indicating condition and sai control means is in said other state of operation to pro vide an acknowledged alarm indication.]

[20. The annunciator circuit of claim 10 wherein sai control circuit means includes means connecting said con dition responsive means to said bistable circuit for operat ing said bistable control circuit into one of its states o operation in response to the change of said condition re sponsive means from its normal to its abnormal indicat ing state, and means responsive to the operation of sai bistable control circuit to said one state of operation fo effecting the operation of said visual alarm means to sai initial alarm state of operation.]

[21. The annunciator of claim 10 including means con necting said condition responsive means into said bistabl circuit for operating the same into a predetermined initia state of operation when the condition responsive means i operated to its normal indicating state.]

[22. The annunciator circuit of claim 10 wherein ther is provided means automatically responsive to the initia energization of the annunciator circuit for setting the bi stable circuit into a predetermined initial state of opera tion.]

[23. The annunciator circuit of claim 10 wherein ther is provided means for initially setting said bistable circui into a predetermined initial state of operation.]

24. The annunciator circuit of claim 10 wherein *eac of* said static means are magnetic core gate units.

*25. An annunciator unit comprising: a first and a sec ond magnetic core "not" gate circuit, each "not" gat circuit including a magnetic core unit with winding thereon, a main signal input terminal, a "not" contro signal input terminal and a signal output terminal, mai signal voltage means connected to said main signal inpu terminals of said first and second "not" gate circuits, sai first and second magnetic "not" gate circuits each fur ther including means connecting said various associate terminals to the associated core windings so that a sig nal output condition exists where appreciable signal from said signal voltage means appear at the associate signal output terminal if a no-signal condition exists a the associated control signal input terminal, and a no signal output condition exists at the associated signa output terminal if an uninhibited signal condition exist at the associated "not" signal input terminal, means con necting said signal output terminal of said first "not gate circuit to the "not" input terminal of said secon "not" gate circuit, whereby the output condition of th first "not" gate circuit controls the output condition o said second "not" gate circuit, means connecting sai signal output terminal of said second "not" gate circui to the "not" input terminal of said first "not" gate cir cuit, whereby the output condition of said second "not gate circuit controls the output condition of said firs "not" gate circuit, condition responsive means havin normal and abnormal indicating conditions when the as sociated variable is respectively normal and abnormal means connecting said condition responsive means to on*

*' said magnetic core "not" gate circuits to inhibit the ]ect of any signals on the "not" control signal input rminal for the period during which a condition respon- ve means is in said normal indicating condition, and ereby provide a signal output condition on the associ- ed "not" gate circuit, and a no-signal output condition the other "not" gate circuit, visual alarm means for oviding a normal, initial abnormal, and an acknowl- lged abnormal indication, said visual alarm means be- g responsive to the signal output conditon of said first- entioned "not" gate circuit and to the abnormal condi- on of said condition responsive means for providing an itial abnormal indication, acknowledgment switch eans for reversing the signal output states of said "not" te circuits when the condition responsive means is in s abnormal condition, and said visual alarm means be- g responsive to said reversal of the signal output condi- ons of said "not" gate circuits by the operation of said anually operable acknowledgment means for providing id acknowledged abnormal indication, field switch eans connected to at least one of said "not" gate cir- its for controlling the output condition thereof and sponsive to the condition of a variable to be moni- red, said field switch means having opposite positions dicating respectively a normal and an abnormal condi- on of the variable said "not" gate circuits having a given itial output condition when said field switch means is itially in a normal indicating position, visual alarm eans for providing a normal, an initial abnormal, and acknowledged abnormal indication, said visual alarm*

*means being connected to said field switch means and to said signal output terminal of said second "not" gate circuit, said field switch means, when in its normal indicating position, operating said visual alarm means to its normal indicating condition, and, when in its abnormal indicating position, effecting the operation of said visual alarm means to its initial abnormal indicating condition, acknowledgment switch means for selectively providing a signal condition at the "not" input terminal of the "not" gate circuit which has a signal output condition whereby a no-signal output condition is produced thereat, said visual alarm means being responsive to said last-mentioned change in the output condition of said latter gate circuit and to the alarm indicating position of said field switch means by providing said acknowledged alarm indication, and said field switch means operating said last-mentioned gate circuit to said signal output condition during the operation thereof to one of said positions.*

References Cited in the file of this patent or the original patent

UNITED STATES PATENTS

| | | |
|---|---|---|
| 2,709,249 | Sperry | May 24, 1955 |
| 2,730,702 | Marmorstone | Jan. 30, 1956 |
| 2,786,147 | Kaufmann | Mar. 19, 1957 |
| 2,817,074 | Faulkner | Dec. 17, 1957 |
| 2,825,894 | Marmorstone | Mar. 4, 1958 |
| 2,832,948 | Derr et al. | Apr. 29, 1958 |
| 2,858,528 | Diener | Oct. 28, 1958 |
| 2,917,731 | Rodgers | Dec. 15, 1959 |